United States Patent
Mimun et al.

(10) Patent No.: US 11,995,146 B1
(45) Date of Patent: May 28, 2024

(54) SYSTEM AND METHOD FOR DISPLAYING REAL-TIME CODE OF EMBEDDED CODE IN A BROWSER-WINDOW OF A SOFTWARE APPLICATION

(71) Applicant: NICE LTD., Ra'anana (IL)

(72) Inventors: Simone Mimun, Givath Shmuel (IL); Omer Naim, Tel Aviv (IL); Hagay Levy, Kfar Yona (IL)

(73) Assignee: NICE LTD., Ra'anana (IL)

( * ) Notice: Subject to any disclaimer, the term of this patent is extended or adjusted under 35 U.S.C. 154(b) by 0 days.

(21) Appl. No.: 18/236,416

(22) Filed: Aug. 22, 2023

(51) Int. Cl.
  *G06F 11/36* (2006.01)
  *G06F 9/445* (2018.01)
  *G06F 16/958* (2019.01)

(52) U.S. Cl.
  CPC ........ *G06F 16/986* (2019.01); *G06F 9/44526* (2013.01)

(58) Field of Classification Search
  CPC ............... G06F 16/986; G06F 11/36–3668
  See application file for complete search history.

(56) References Cited

U.S. PATENT DOCUMENTS

| | | | | |
|---|---|---|---|---|
| 6,021,416 A * | 2/2000 | Dauerer | ................ | G06F 40/166 707/999.2 |
| 6,668,369 B1 * | 12/2003 | Krebs | ................. | G06F 11/3664 717/125 |
| 7,426,717 B1 * | 9/2008 | Schang | ............... | G06F 11/3664 717/124 |
| 8,356,277 B1 * | 1/2013 | Bank | ................... | G06F 9/45529 717/111 |

(Continued)

FOREIGN PATENT DOCUMENTS

| | | | | |
|---|---|---|---|---|
| CN | 108182149 A | * | 6/2018 | |
| CN | 108197024 A | * | 6/2018 | .......... G06F 11/3624 |

(Continued)

OTHER PUBLICATIONS

English Translation of CN 108182149 A published on Jun. 19, 2018 (Year: 2018).*

(Continued)

*Primary Examiner* — Daniel Rodriguez
(74) *Attorney, Agent, or Firm* — Soroker Agmon Nordman Riba; Liat Lin; Sharone R. Godesh

(57) ABSTRACT

A computer-implemented method for displaying real-time code of embedded code in a browser-window of a software-application. The computer-implemented method includes collecting processes related to software applications running on an OS by using an API. For each process: searching for browser windows including elements used to collect or manipulate data on the browser-window to yield a list of browser-windows; receiving a selection of a browser-window; casting elements used to collect or manipulate data on the browser-window of the selected browser-window into a related object that is implementing an interface and storing it with an associated address of the browser-window in a database; and presenting real-time code of the elements used to collect or manipulate data on the browser-window to enable errors inspection therein and real-time updates of the code of the elements used to collect or manipulate data on the browser-window, via the interface of the related object.

13 Claims, 13 Drawing Sheets

(56) References Cited

U.S. PATENT DOCUMENTS

| | | | |
|---|---|---|---|
| 2011/0289486 A1* | 11/2011 | Revinskaya | G06F 11/3636 |
| | | | 717/124 |
| 2012/0078707 A1* | 3/2012 | Ramakrishnan | H04L 65/80 |
| | | | 705/14.41 |
| 2015/0169434 A1* | 6/2015 | De Angelis | G06F 11/3692 |
| | | | 717/124 |
| 2017/0123957 A1* | 5/2017 | Gupta | G06F 11/0715 |
| 2018/0039530 A1* | 2/2018 | Ciabarra, Jr. | G06F 11/006 |
| 2023/0236712 A1* | 7/2023 | Marinovici | G06F 3/0482 |
| | | | 715/738 |

FOREIGN PATENT DOCUMENTS

| | | | | |
|---|---|---|---|---|
| CN | 108874674 A | * | 11/2018 | G06F 11/362 |
| CN | 113608997 A | * | 11/2021 | |
| JP | 2008112300 A | * | 5/2008 | G06F 11/3688 |

OTHER PUBLICATIONS

English Translation of CN 108197024 A published on Jun. 22, 2018 (Year: 2018).*

English Translation of CN 108874674 A published on Nov. 23, 2018 (Year: 2018).*

English Translation of CN 113608997 A published on Nov. 5, 2021 (Year: 2021).*

English Translation of JP 2008112300 A published on May 15, 2008 (Year: 2008).*

* cited by examiner

SYSTEM AND METHOD FOR DISPLAYING REAL-TIME CODE OF EMBEDDED CODE IN A BROWSER-WINDOW OF A SOFTWARE APPLICATION

TECHNICAL FIELD

The present disclosure relates to the field of code embedded in a browser-window of a software application. More specifically, the present disclosure relates to the field of displaying real-time code of embedded code in a browser-window of a software application for code inspection, debugging and errors correction.

BACKGROUND

Browser windows of software applications commonly include one or more elements used to collect or manipulate data on the browser-window, e.g., web browser controls. These elements are implemented by a code embedded in the browser window, which is commonly either original, or injected code from external source which provides external data or from injected component that provides dynamic data.

When developers build a browser-window, commonly there may be a request incorporated in the embedded code, to inject a component. The injected component may include a code from external source which provides external data or a code that provides dynamic data. Testing and debugging for errors this code, i.e., the injected code from external source and provides external data or the injected code which provides dynamic data, are resource exhausting, difficult or challenging as the real-time code is determined only during run-time of the software application that pops up the browser-window and it is not shown to the developer via the embedded code of the browser-window.

Attended automations are automations, i.e., software applications, that run under user supervision. Robotic Process Automation (RPA) systems allow organizations to improve their processes by automating repetitive routines, such as data entry, data transfer, and verification tasks, particularly, when such tasks involve multiple software applications, an attended automation may pop-up a browser window, which requires the user's attention. A callout window is a user interface element that typically appears as a pop-up or overlay browser-window within the software application interface when the attended automations are in process. The purpose of a browser-window, such callout window, is to provide additional information, functionality, or interaction options to the users, while the automation is running.

Currently, developers are facing challenges when attempting to modify and test code within these active processes having web browsers of attended automations in an RPA system, such as "callout window". The callout window is a specific window within a Windows application that may contain web browser controls, such as Hyper Text Markup Language (HTML). JavaScript, and Cascading Style Sheets (CSS) elements.

The callout window displays contextual information, tooltips, notifications, or options for performing specific actions related to the content or task at hand, when an automation is running. For example, during the automation, a callout window may display detailed information about a specific customer when the user hovers over or clicks on the customer name. The callout window may display relevant data, such as contact details, transaction history, or any other information that aids handling customer relationship.

Currently, there is no straightforward way nor tool to preview, debug and investigate the embedded code of the browser window at nm-time for all the scenarios, as the embedded code may be different than the real-time code and consequently, developers face significant challenges and time-consuming processes when attempting to modify and test code within these attended automation active processes. This limitation leads to resource wastage, frustration, and negatively impacts user experience.

Therefore, there is a need for a technical solution to overcome the limitation of debugging, observing, and changing the code of web browser controls, in a browser window, such as "callout window" and all active processes running in browser-windows that utilize web browser controls, such as HTML controls, during runtime.

There is a need for displaying real-time code of embedded code in a browser-window of a software application.

SUMMARY

There is thus provided, in accordance with some embodiments of the present disclosure, a computer-implemented method for displaying real-time code of embedded code in a browser-window of a software application.

Furthermore, in accordance with some embodiments of the present disclosure, the computer-implemented method may include collecting one or more processes related to one or more software applications which are running on an Operating System (OS), by using an Application Programming Interface (API);

Furthermore, in accordance with some embodiments of the present disclosure, the computer-implemented method may further operate for each process in the collected one or more processes: (i) searching for browser-windows that include one or more elements used to collect or manipulate data on a browser-window to yield a list of one or more browser-windows; (ii) receiving a selection of a browser-window from the list of one or more browser-windows; (iii) casting one or more elements used to collect or manipulate data on the browser-window of the selected browser-window into a related object that is implementing an interface and storing the related object with an associated address of the browser-window in a database; and (iv) presenting real-time code of the one or more elements used to collect or manipulate data on the browser-window to enable errors inspection therein and real-time one or more updates of the code of the one or more elements used to collect or manipulate data on the browser-window via the interface of the related object.

Furthermore, in accordance with some embodiments of the present disclosure, the computer-implemented method may further include receiving a selection of more than one browser-window from the list of one or more browser-windows, and then casting one or more elements used to collect or manipulate data on the browser-window of each selected browser-window of the more than one browser-window into a related object that is implementing an interface and storing the corresponding object with an associated address of the related browser-window in a database and then presenting real-time code of the one or more elements used to collect or manipulate data on each elected browser-window to enable errors inspection therein and real-time one or more updates of the code of the one or more elements used to collect or manipulate data on each browser-window via the interface of the related object.

Furthermore, in accordance with some embodiments of the present disclosure, the real-time code is at least one of:

(i) original code; (ii) injected code from external source which provides external data; and (iii) injected code which provides dynamic data.

Furthermore, in accordance with some embodiments of the present disclosure, the one or more elements used to collect or manipulate data in the selected browser-window interpret into User Interface (UI) may be at least one code type of: (i) Hyper Text Markup Language (HTML) code; (ii) JavaScript code; and (iii) Cascading Style Sheets (CSS) code.

Furthermore, in accordance with some embodiments of the present disclosure, a software application of the one or more software applications may be an attended automation that runs under user supervision and the browser-window may be a callout window within a User Interface (UI) for the attended automation.

Furthermore, in accordance with some embodiments of the present disclosure, the one or more elements used to collect or manipulate data on the browser-window may be web browser controls. For example, HTML controls.

Furthermore, in accordance with some embodiments of the present disclosure, the one or more processes may be Windows® processes and the searching for one or more browser-windows including one or more elements used to collect or manipulate data on the browser-window may be operated by a mechanism of Windows® OS.

Furthermore, in accordance with some embodiments of the present disclosure, the mechanism of the Windows® OS may be sendWindowMessage* with WM_HTML_GETOBJECT* parameter.

Furthermore, in accordance with some embodiments of the present disclosure, the implemented interface is an IHTMLDocumnet2 interface.

Furthermore, in accordance with some embodiments of the present disclosure, the object is an HTMLDocument2 object which examines and modifies HTML elements and text of the HTMLDocument2 object via the IHTMLDocument2 interface.

Furthermore, in accordance with some embodiments of the present disclosure, the searching of one or more browser-windows may be operated when an application is loaded and when a search is initiated by a user.

Furthermore, in accordance with some embodiments of the present disclosure, when real-time one or more updates are performed by a user to the code of the one or more elements used to collect or manipulate data on the browser-window via the interface, the computer-implemented method may further enable an update process of the code of the one or more elements used to collect or manipulate data on the browser-window, by using the associated address of the browser-window, within the OS.

Furthermore, in accordance with some embodiments of the present disclosure, the API may enable developers to interact with the OS to develop applications.

DETAILED DESCRIPTION

Figure 1:
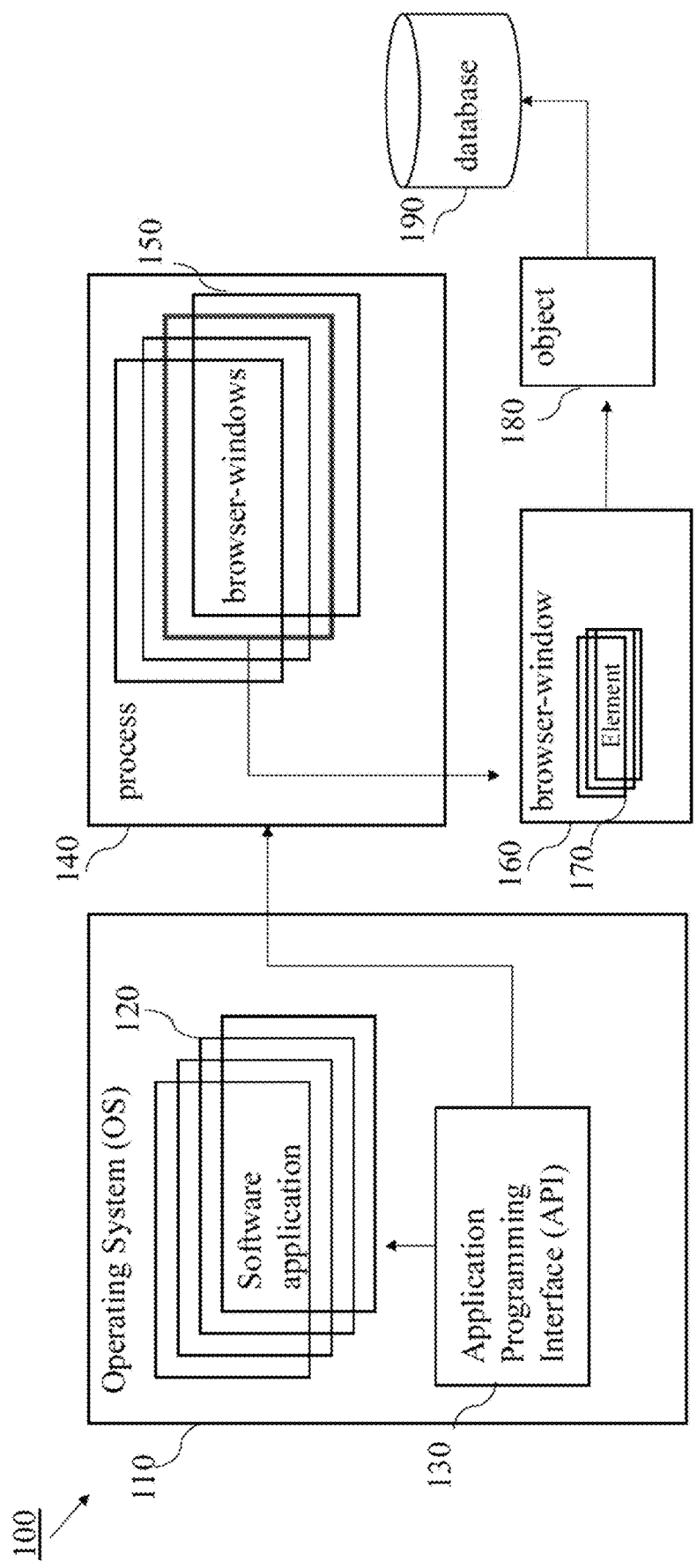
FIG. 1 schematically illustrates a high-level diagram of a system for displaying real-time code embedded in a browser-window of a software application, in accordance with some embodiments of the present disclosure.

In the following detailed description, numerous specific details are set forth in order to provide a thorough understanding of the disclosure. However, it will be understood by those of ordinary skill in the art that the disclosure may be practiced without these specific details. In other instances, well-known methods, procedures, components, modules, units and/or circuits have not been described in detail so as not to obscure the disclosure.

Although embodiments of the disclosure are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes.

Although embodiments of the disclosure are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

Currently, there is no technical solution that enables a display of real-time code of a browser-window of a software application during the run-time of the software application via an editor for errors correction that later on may be copied to update the embedded code of the browser-window. Therefore, testing and debugging dynamic scenarios within a native Window application is currently lengthy and time-consuming as the code must run for the developers to see the effect of updates in the embedded code in live environment. Consequently, developers often end up modifying and testing the code outside the live environment again and again. Commonly, the real-time code of the embedded code of browser-windows is needed for testing and debugging attended automations which are automations that run under user supervision in a Robotic Process Automation (RPA) system.

Automation developers are required to perform repetitive iterations of modification of the embedded code of the browser-windows outside the live environment and then to test the modified code in live environment, which is time-consuming, frustrating, and inefficient.

For example, a table which has been programmed to be presented via a browser-window may be populated during run-time with data from an external API. An injected component, which may be implemented by a JavaScript (JS) code, may operate a request for the data and may provide the data to the table. At run-time, the code from external sources that the browser-window waits for, i.e., real-time code can change and may not be exposed to the developer be the embedded code before run-time. During the automation run-time, the code that comes from the external API, i.e., real-time code, is unknown and depends on the external source. Therefore, an embedded code entered by the developer may be 'expecting' a table with 1000 records, each having 50 fields. However, the table provided by the external API may display only 10 records, or none records at all.

Moreover, the format of the displayed records in the table provided by the external API might deviate from the expected layout of the embedded code, for example, lacking alignment, order, or proper sequencing. In such situations, developers may encounter significant challenges, particularly when the data originates externally or is dynamically generated. Therefore, there is a need for a technical solution to either manually enable developers to pinpoint specific problems within the embedded code, that is reflected only in real-time code, such as missing tags or conflicts in JavaScript and HTML IDs, such that the problems are addressed or to automatically detect such errors and correct them.

In another example, when an injected code of web browser window in a browser-window provides dynamic data, which can change at any given time. For example, a representation of a number which is a calculation of average users reported a problem may be formatted in various ways e.g., xx.x, or xx.xxx, or 00xx.x and the like, and the result in the web browser control, e.g., HTML control may be inconsistent, because the format of the number which has been provided by the developer in the embedded code is different than the format that the number that the component has sent.

In another example, an embedded code in browser-window having a JavaScript command that performs a certain action on the browser-window, the action may be dynamic data received by the JS command which may change by a given scenario, such that each reading has its own content. There may be situations that the received data is incorrect, broken, or even overrides previous settings of the browser-window.

In another example, dynamic data that changes and generates an issue to be resolved by the developer is a database call that provides content into a table which has been created in design time, e.g., in the embedded code which may include different columns than the data received from the external source during run time on the browser-window. The provided table from the database call may have fewer columns than the table in the embedded code of the browser-window. In such a case, the table presented via the browser-window may have empty or unexpected columns or the database call may provide a table with more columns than the table in the embedded-code of the browser-window, which results in a broken display of the data. The broken display of the data is when the table presented via the browser-window by the embedded code may not fit to the provided data, and it has to be fixed by either a developer via an editor or automatically.

Accordingly, there is a need for method and system for displaying real-time code of embedded code in a browser-window of a software application and enabling an update of the code. There is a need for a technical solution for updating debugging and developing callout windows that are being triggered during run-time of Robotic Process Automation (RPA).

FIG. 1 schematically illustrates a high-level diagram of a system 100 for displaying real-time code of embedded code in a browser-window of a software application, in accordance with some embodiments of the present disclosure.

According to some embodiments of the present disclosure, a system such as system 100 may be implemented as an inspector tool for Windows apps and for attended automation environment to enable real-time debugging, updating, and changing of browser-windows, such as callout windows and active processes within the attended automation environment.

According to some embodiments of the present disclosure, system 100 may enable real-time debugging, updating, and changing of browser windows, such as callout windows and active processes within the attended automation environment. System 100 may enable developers to directly modify and test embedded code of the browser-windows, such as Hyper Text Markup Language (HTML), JavaScript (JS), and Cascading Style Sheets (CSS) code within the browser window and active processes, via an editor during run-time e.g., without the need to exit the live environment.

According to some embodiments of the present disclosure, the real-time debugging capability of system 100 may streamline the development process for browser-windows of attended automations and may enhance efficiency of code development.

According to some embodiments of the present disclosure, system 100 provides a mechanism for real-time debugging and updating of browser-windows, by enabling a display of a real-time code of the code embedded in a browser-window of a software application that is running in live environment and then enabling an update of the real-time code, while operating in the live environment.

According to some embodiments of the present disclosure, system 100 may display via an editor, the real-time of the code embedded of the browser-window of the software application that is running, by collecting one or more processes related to one or more software applications 120 running on an Operating System (OS) 110, by using an Application Programming Interface (API) 130.

According to some embodiments of the present disclosure, the API 130 may be Win32 native API which is provided by Windows OS. The Win32 API is a set of functions and tools for developing Windows applications. Win32 API allows developers to interact with the Windows OS to create desktop applications, games, and utilities, handling tasks like window creation, user input, file management, graphics, and system resources.

According to some embodiments of the present disclosure, for each process 140 in the collected one or more processes, one or more browser windows including one or more elements used to collect or manipulate data on a browser-window may be searched, to yield a list of one or more browser-windows 150.

According to some embodiments of the present disclosure, a search for a selected browser-window or more than one selected browser-window may be operated by the developer clicking on a search for al processes. A GetAllProcess method may be invoked to request the Windows OS to provide it the array for all processes. If the number of processes in the array is not greater than '0' no code may be uploaded for the developer. If the number of processes in the array is greater than '0', then, all browser windows 150 with web browser controls, e.g., windows with HTML control may be retrieved.

According to some embodiments of the present disclosure, an iteration on each process may be further operated to check if it contains an innerHTML value, i.e., other Window applications. Then, all processes that include one or more browser-windows that have one or more elements used to collect or manipulate data on a browser-window e.g., processes that have an innerHTML value, may be stored in a local storage (not shown).

According to some embodiments of the present disclosure, the list of one or more browser-windows 150 may be populated in a select control, e.g., drop-down list including the title of the browser-window, such that a developer may select the browser-window for inspection from the list based on the browser-window title.

According to some embodiments of the present disclosure, optionally, the searching of the one or more browser-windows of a software application may be operated when the software application is loaded in the OS 110 and may be stored in a local storage with corresponding title. In that case, the browser-window 160 may be retrieved from the local storage and populated in a drop-down list, where the developer may select from a browser-window for inspection. Once the developer has selected the browser-window title from the drop-down list, the corresponding object e.g., IHTMLDocumet2 object, may be set as current window.

According to some embodiments of the present disclosure, optionally, the searching of the one or more browser-windows may be operated when a search is initiated by a user, for example, by clicking on a dedicated search button on the browser-window.

According to some embodiments of the present disclosure, the one or more elements used to collect or manipulate data on the browser-window may be web browser controls, such as HTML controls.

According to some embodiments of the present disclosure, in a non-limiting example, the HTML controls may be one of: Text Input: <input type="text"> which allows users to enter text or numbers into a single-line input field, Text Area: <textarea> which is used for multi-line text input, such as for longer comments or descriptions, Checkbox: <input type="checkbox"> which represents a binary choice, allowing users to select one or multiple options, Radio Button: <input type="radio"> which allows users to select a single option from a set of mutually exclusive choices, Select Dropdown: <select> which creates a dropdown list of options from which users can select one, Button: <button> which triggers an action when clicked, such as submitting a form or performing a specific function, Submit Button: <input type="submit"> which submits a form to the server for processing. Reset Button: <input type="reset"> which resets the form's fields to their default values, Range Slider: <input type="range"> which allows users to select a value from a range by sliding a handle along a track, Date Picker: <input type="date"> which provides a calendar-based interface for selecting dates.

According to some embodiments of the present disclosure, the one or more processes may be Windows® processes and the searching for one or more browser-windows including one or more elements used to collect or manipulate data on the browser-window may be operated by a mechanism of Windows® OS.

According to some embodiments of the present disclosure, the mechanism of the Windows® Operating System (OS) may be sendWindowMessage* with WM_HTML_GETOBJECT* parameter.

According to some embodiments of the present disclosure, a selection of a browser-window from the list of one or more browser-windows 150 may be received from a user, such as a developer during run-time of an automation. The selection of the browser-window may be for code inspection and debugging of the embedded code of the browser-window.

According to some embodiments of the present disclosure, one or more elements 170 used to collect or manipulate data on the browser-window of the selected browser-window 160 may be casted into a related object 180 that is implementing an interface, which may be stored with an associated address of the browser-window in a database 190.

According to some embodiments of the present disclosure, optionally, a developer may launch and test more than a single browser-window. There may be several browser-windows related to an attended automation process that runs in run-time which the developer might want or need to inspect. The browser-windows may be related because one browser-window may invoke another one, or there could also be data transfers from one browser-window to another. Therefore, it is essential to provide a developer the option to select all the browser-windows generated by the attended automation process and the browser-windows generated by other software applications.

Figure 9:
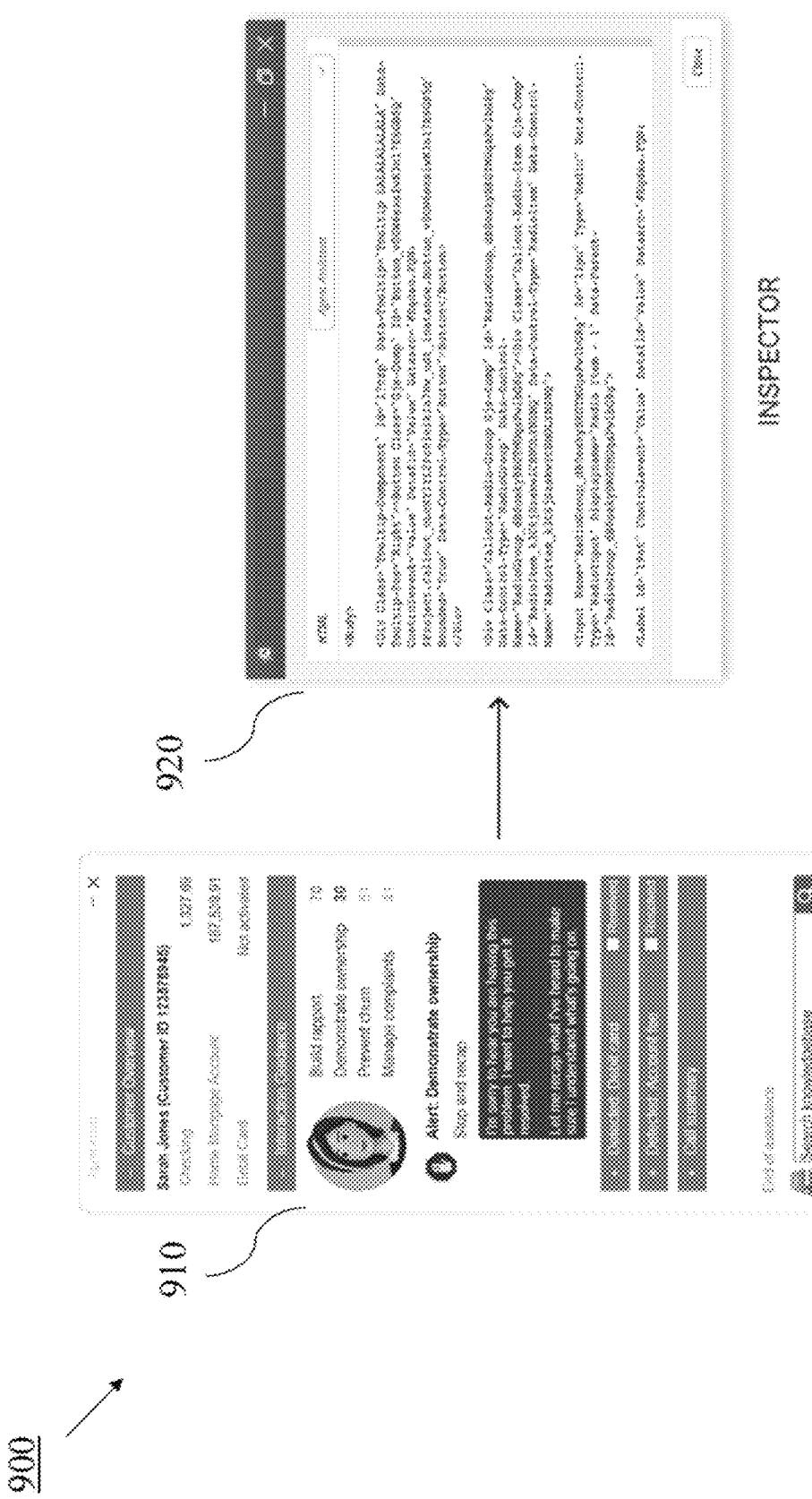
FIG. 9 is an example of a callout window and a callout debugger, in accordance with some embodiments of the present disclosure.

According to some embodiments of the present disclosure, the real-time code of the one or more elements 170 used to collect or manipulate data on the browser-window 160, may be presented to enable errors inspection therein and real-time one or more updates of the code of the one or more elements used to collect or manipulate data on the browser-window via the interface of the related object, e.g., via an editor. The real-time code may be presented via the editor, such that updates to the embedded code on the browser-window may be enabled, e.g., as shown in FIG. 9.

According to some embodiments of the present disclosure, the implemented interface of the related object may be an IHTMLDocumnet2 interface. The object 180 may be for example, an HTMLDocument2 object, which may enable inspection and updates of HTML elements and text, via an editor, such as the IHTMLDocument2 interface.

According to some embodiments of the present disclosure, the real-time code of the elements 170 in the browser-window 160, may be at least one of: (i) original code; (ii) injected code from external source which provides external data; and (iii) injected code which provides dynamic data.

According to some embodiments of the present disclosure, the one or more elements 170 used to collect or manipulate data in the selected browser-window that interpret into User Interface (UI), may be web browser controls of at least one code type of: (i) Hyper Text Markup Language (HTML) code; (ii) JavaScript code; and (iii) Cascading Style Sheets (CSS) code.

According to some embodiments of the present disclosure, a software application of the one or more software applications 120 may be for example, an attended automation that runs under user supervision and the browser-window may be a callout window within a UI for the attended automation.

According to some embodiments of the present disclosure, errors in injected code of browser-windows may occur by conflicts with the developers embedded code. For example, when using the same ID for a single component or different dependencies like different versions of JavaScript library, e.g., Jquery. The developer may resolve these conflicts by adjustments in the embedded code.

According to some embodiments of the present disclosure, for example, a button element may have an ID attribute set to "myButton". <button id="myButton">Click Me</button>. If the injected code from the external source is using the same ID for any other element the system will crash. In other cases, visual issues can be resolved by overwriting the CSS classes, while HTML errors can be fixed using JavaScript.

According to some embodiments of the present disclosure, in another example, the button element has a class attribute set to "myButton". <button class="myButton">Click Me</button>. When the button is coming from an external source, but is shown in the browser-window in a very small size, that needs to be fixed, the developer may correct the size issue of the button, by updating the embedded code of the browser-window with an added code such as the script shown below:

button.myButton {
width: 150px; /*Set the width of the button*/
height: 50px; /*Set the height of the button*/
}

The CSS styles target all buttons with the class "myButton" and set their width to 150 pixels and height to 50 pixels thus solving the issue of small size of the button.

According to some embodiments of the present disclosure, in some situations, the developer may have tracked the source of the issue in the embedded code and there may not be a fix for it. Then, the developer may approach the provider of the external source for support and resolution. For example, when there is an error in the generation of a recording that should be executed, the user can open a bug report with the specific provider of this data.

According to some embodiments of the present disclosure, optionally, a selection of more than one browser-window from the list of one or more browser-windows 150 may be received. Then, one or more elements used to collect or manipulate data on each selected browser-window of the more than one browser-window 170 may be casted into a related object 180 that is implementing an interface.

According to some embodiments of the present disclosure, the corresponding object 180 may be stored with an associated address of the related browser-window in a database 190. The real-time code of the one or more elements used to collect or manipulate data on each elected browser-window may be presented via an editor to enable errors inspection therein and real-time one or more updates of the code of the one or more elements used to collect or manipulate data on each browser-window via the interface of the related object.

According to some embodiments of the present disclosure, optionally, the real-time code of the one or more elements used to collect or manipulate data on the browser-window may be copied to an editor for automatic parsing and error detection. For example, an editor such as Integrated Development Environment (IDE) can identify the format of the text, such as JavaScript or JavaScript Object Notation (JSON) or CSS or HTML and the like and can display the code in a more convenient way to the user. In some cases, coding errors can be automatically detected by some editors. Errors resulting from an incorrect logic may be manually handled by the developer or an AI-based copilot plugin which some editors support.

According to some embodiments of the present disclosure, an error in the JS code may be a result of a syntax error, incorrect logic, deficient performance coding, or security breaches, e.g., unmasked passwords. By presenting the real-time code to a developer those issues may be identified and fixed in any code editor or any other IDE, such as Visual Studio (VS) code, via updates of the embedded-code, by copying and pasting into the original browser-window editor, e.g., callout editor.

Figure 2A:
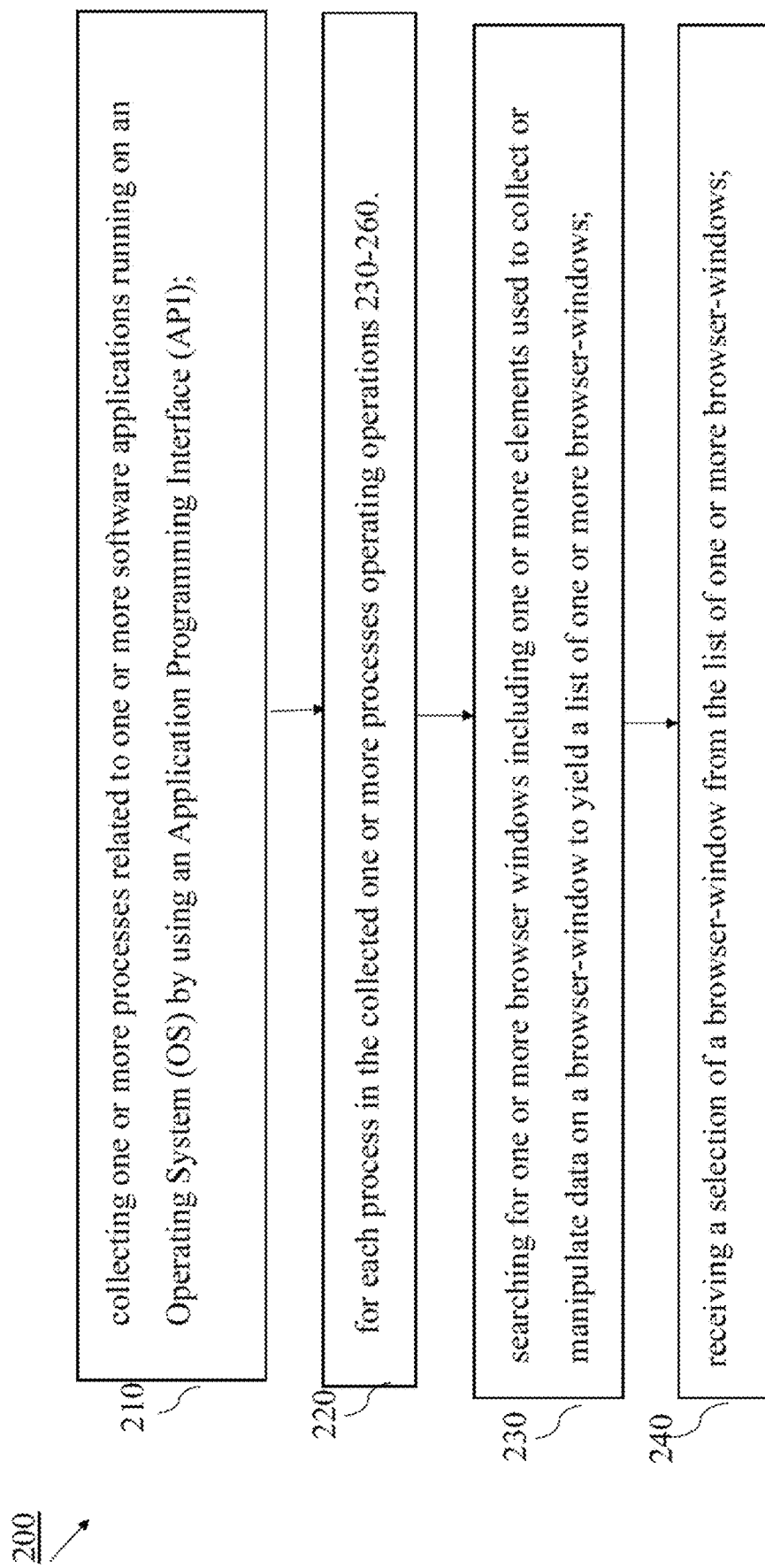
FIGS. 2A-2B are a high-level workflow of a computer-implemented method for displaying real-time code of embedded code in a browser-window of a software application, in accordance with some embodiments of the present disclosure.
Figure 2B:
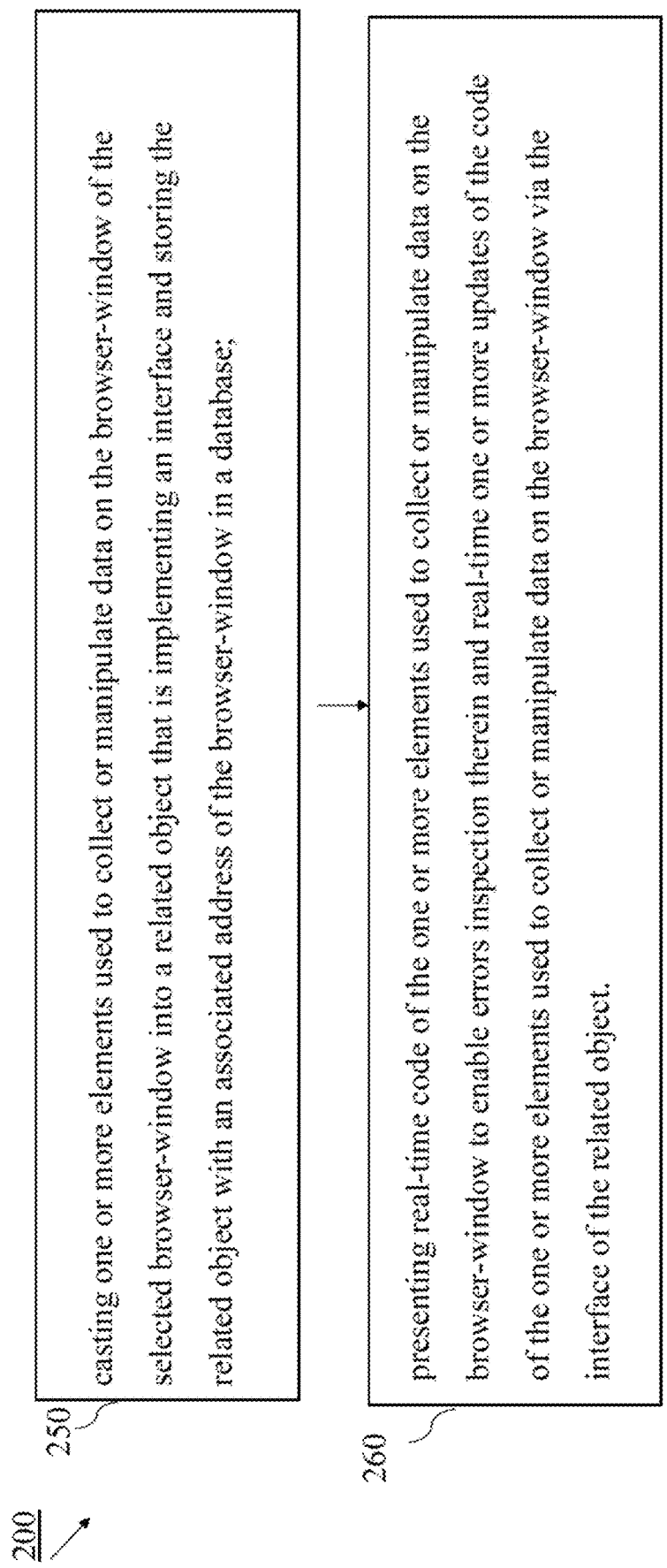

FIGS. 2A-2B are a high-level workflow 200 of a computer-implemented method for displaying real-time code of embedded code in a browser-window of a software application, in accordance with some embodiments of the present disclosure.

According to some embodiments of the present disclosure, operation 210 comprising collecting one or more processes related to one or more software applications running on an Operating System (OS) by using an Application Programming Interface (API).

According to some embodiments of the present disclosure, operation 220 comprising for each process in the collected one or more processes operating operations 230-260.

According to some embodiments of the present disclosure, operation 230 comprising searching for one or more browser windows including one or more elements used to collect or manipulate data on a browser-window to yield a list of one or more browser-windows.

According to some embodiments of the present disclosure, operation 240 comprising receiving a selection of a browser-window from the list of one or more browser-windows.

According to some embodiments of the present disclosure, operation 250 comprising casting one or more elements used to collect or manipulate data on the browser-window of the selected browser-window into a related object that is implementing an interface and storing the related object with an associated address of the browser-window in a database.

According to some embodiments of the present disclosure, operation 260 comprising presenting real-time code of the one or more elements used to collect or manipulate data on the browser-window to enable errors inspection therein and real-time one or more updates of the code of the one or more elements used to collect or manipulate data on the browser-window via the interface of the related object.

Figure 3:
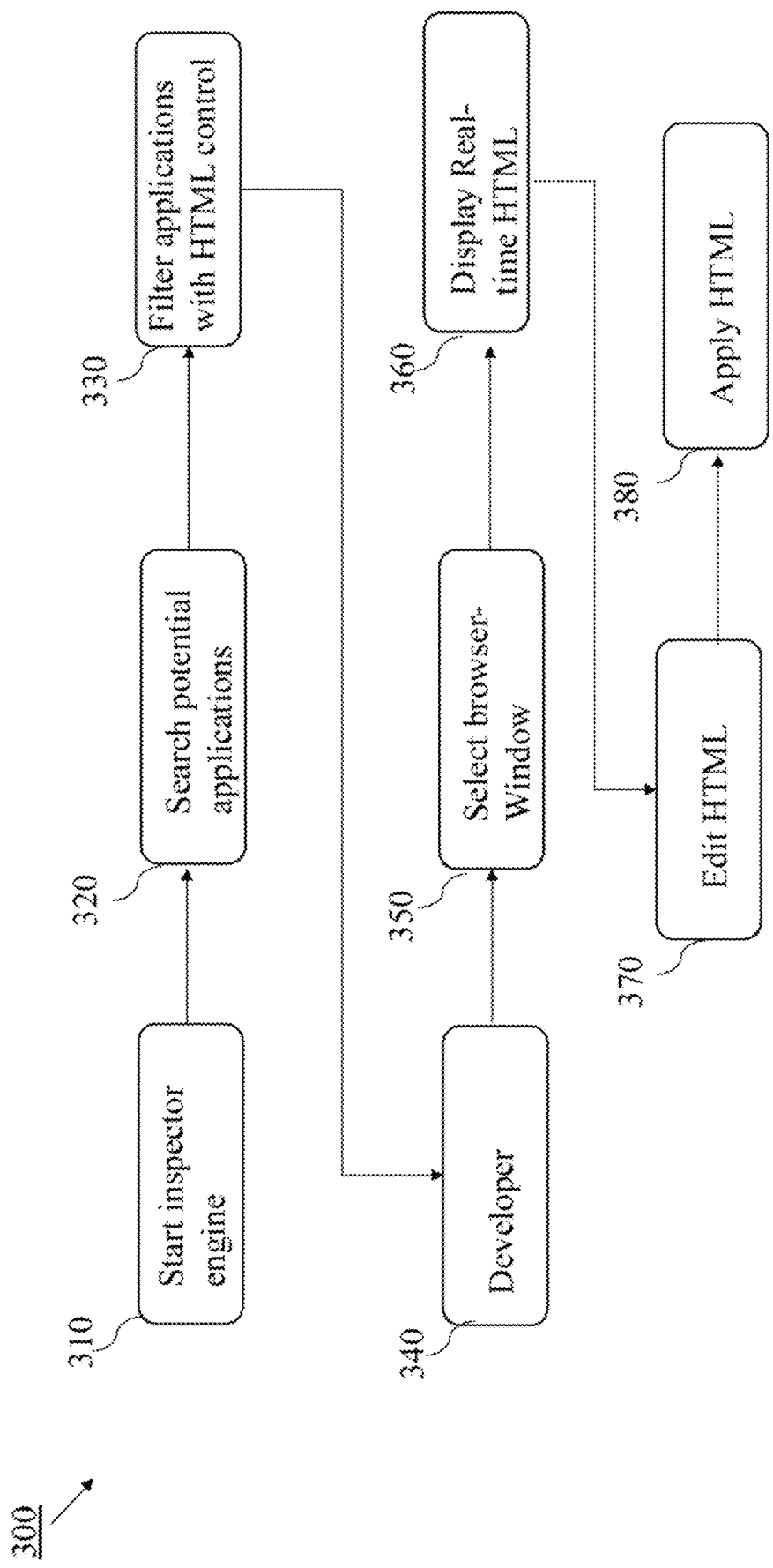
FIG. 3 is a high-level workflow of code inspection and update process, in accordance with some embodiments of the present disclosure.

FIG. 3 is a high-level workflow 300 of code inspection and update process, in accordance with some embodiments of the present disclosure.

According to some embodiments of the present disclosure, developers in a system, such as system 100 may be enabled to investigate the embedded code, e.g., HTML code, identify errors or mistakes, and make real-time corrections. Once the editing of the code is completed, users can initiate the update process by clicking an update button. The update action takes the user's embedded code and sets it in the appropriate field, e.g., HTML field of the browser-window object. As this object, such as object 180 in FIG. 1, may represent the actual browser-window, it may be dynamically updated through this assignment.

According to some embodiments of the present disclosure, when one or more software applications are running, there may be browser-windows with web browser controls having real-time code different than the embedded code of the browser-window, e.g., browser windows including real-time HTML code. Developers may can inspect and edit the embedded code of the browser-window, by starting the inspector engine 310. The inspector engine may be a system such as system 100 in FIG. 1.

According to some embodiments of the present disclosure, upon the starting of the inspector engine, processes of potential applications may be searched 320. Applications with windows having browser-windows with web browser controls, such as HTML controls, may be filtered 330 to yield a list of browser-windows.

According to some embodiments of the present disclosure, the list of browser-windows may be populated in a drop-down list to be presented to the developer 340 to enable selection of a browser-window by the browser-window title.

According to some embodiments of the present disclosure, the developer may select a browser-window 350 from the list for inspection and debugging purposes. Upon the developer selection of the browser-window one or more elements used to collect or manipulate data on the browser-window, e.g., web browser controls of the selected browser-window may be casted into a related object that is implementing an interface and the related object may be stored with an associated address of the browser-window in a database, such as database 190, in FIG. 1.

According to some embodiments of the present disclosure, real-time code of the one or more elements used to collect or manipulate data on the browser-window may be presented to enable errors inspection therein, e.g., display real-time HTML 360.

According to some embodiments of the present disclosure, real-time one or more updates of the code of the one or more elements used to collect or manipulate data on the browser-window via the interface of the related object may be enabled, the developer may edit HTML 370 and then apply HTML 380.

According to some embodiments of the present disclosure, when changes are made to the embedded code, e.g., origin HTML text of the browser-window, via an interface, such as interface of the object 180 in FIG. 1, the software application marks it as dirty, and an update button may be enabled. When the developer clicks on the update button an execution of a method, such as "set HTML property" method, which sets the original HTML content with the HTML edited by the developer, so it may affect the actual browser-window in real-time, may be triggered.

According to some embodiments of the present disclosure, the triggered method may cause the software application to replace the embedded code with the updated code.

After the replacement, the value of the HTML content property which is part of the object, such as object 180 in FIG. 1, that is implementing the IHTMLDocument2 Interface. The editor content is the value of the content property of the object interface. The real browser-window may be updated using the window address in memory, which is stored in the database, such as database 190 in FIG. 1. As a result, the inner code of the browser-window, e.g., inner HTML may be dynamically changed in real-time within the operating system.

Figure 4:
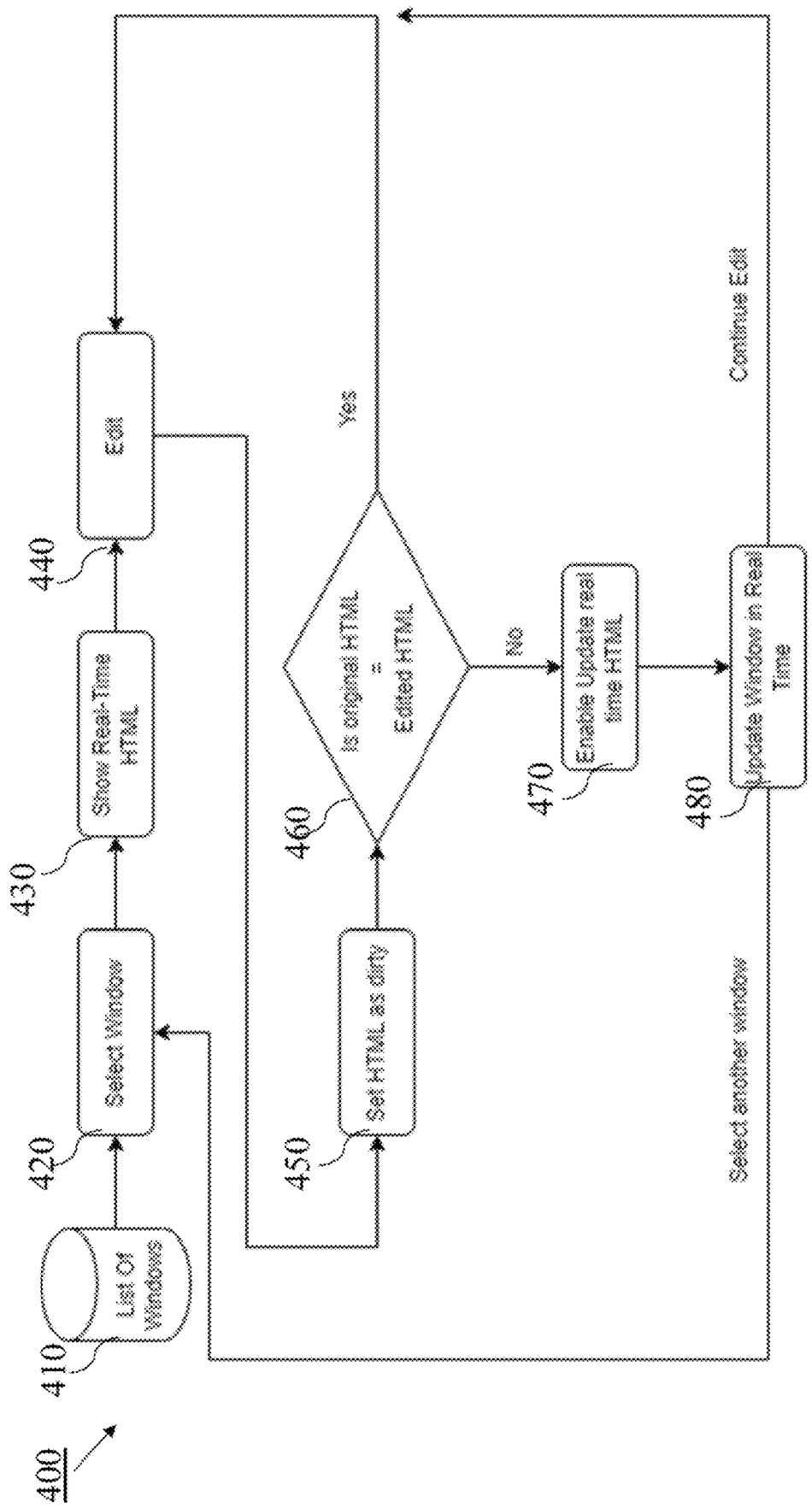
FIG. 4 is a high-level workflow of code inspection and update, in accordance with some embodiments of the present disclosure.

FIG. 4 is a high-level workflow of code inspection and update, in accordance with some embodiments of the present disclosure.

Figure 6:
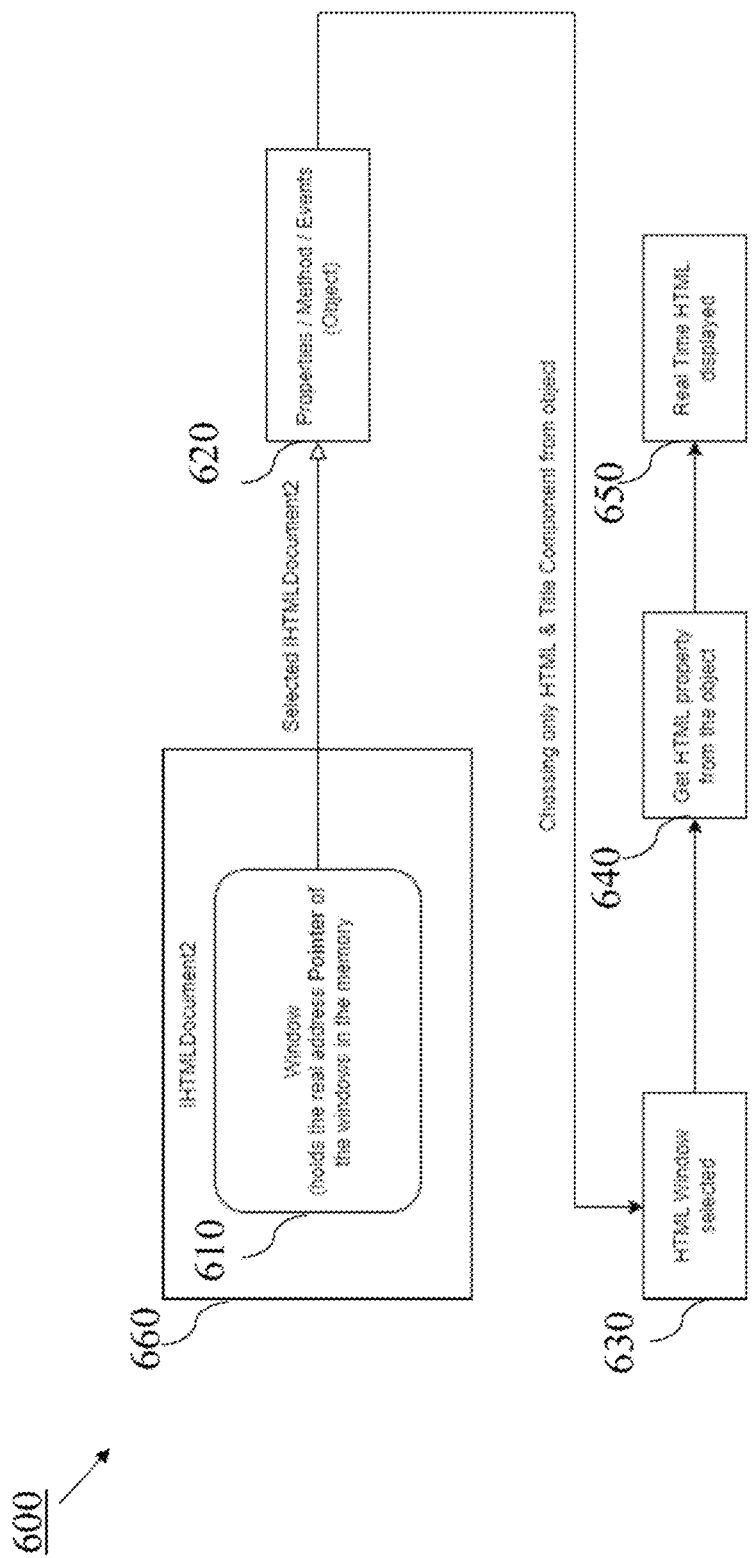
FIG. 6 is a high-level workflow of window selection from a list of browser-windows, in accordance with some embodiments of the present disclosure.

According to some embodiments of the present disclosure, a list of browser windows, such as browser-windows 150 may be retrieved from a local storage 410. The list of browser-windows includes window objects, and window titles may be presented to the user via a drop-down list for selection therefrom for code inspection and correction. e.g., select window 420. For example, a browser-window may be selected as shown in FIG. 6 and then displayed in real-time.

According to some embodiments of the present disclosure, the developer may edit 440 the code which may set the HTML code as dirty 450.

According to some embodiments of the present disclosure, a system, such as system 100 in FIG. 1, which may operate as an inspection application, there may be a text component that shows the HTML content of the real-time code and may enable a developer to edit it. This text component may identify changes and may mark the HTML code as "dirty" once the developer makes changes to the HTML code. Upon checking if the existing HTML code is similar to the edited HTML code 460, when the code is not similar, then an update of the code may be enabled in real-time 470 and the browser-window may be updated in real-time 480, e.g., n live environment.

According to some embodiments of the present disclosure, when the code is similar, then the developer may keep on editing 440.

Figure 5:
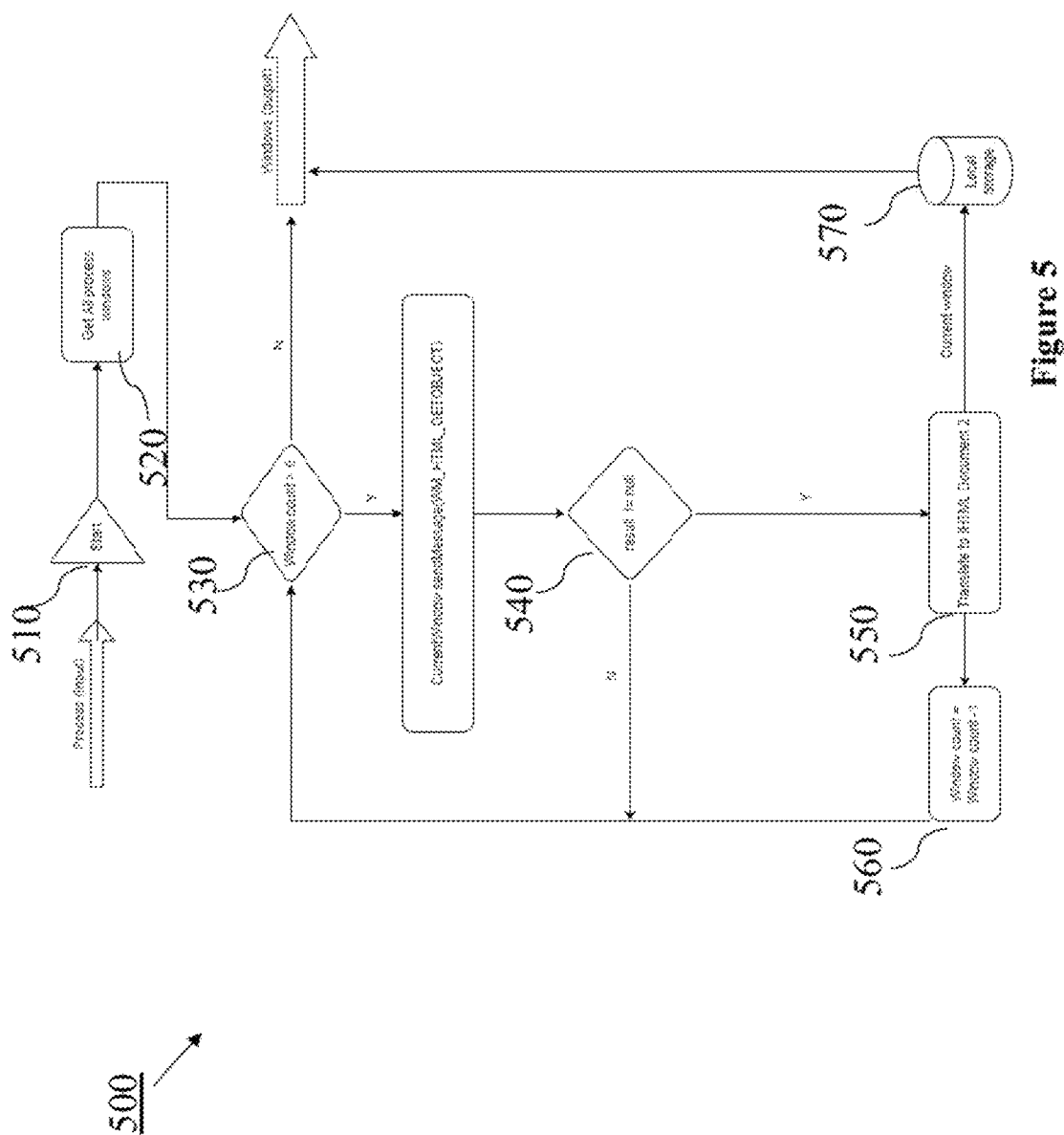
FIG. 5 is a high-level workflow of window process extraction of a list of browser-windows, in accordance with some embodiments of the present disclosure.

FIG. 5 is a high-level workflow 500 of window process extraction of a list of browser-windows, in accordance with some embodiments of the present disclosure.

According to some embodiments of the present disclosure, a search for one or more browser-windows that include web browser controls may be initiated when the application loads, and also a developer may initiate a search again by clicking on a search button at any given time when a browser-window is displayed, i.e., popped up.

According to some embodiments of the present disclosure, one or more processes related to one or more software applications running on an Operating System (OS) may be collected 520 by using an Application Programming Interface (API).

According to some embodiments of the present disclosure, for each process in the collected one or more processes a system, such as system 100 in FIG. 1, may be searching for one or more browser-windows including one or more elements used to collect or manipulate data on a browser-window to yield a list of one or more browser-windows.

According to some embodiments of the present disclosure, each process in the collected processes may be run one by one to checked if they include web browser controls. Then checking if the number of collected processes is greater than '0' 530. If the number is greater than '0' then, a method, such as method CurrentWindow.sendMessage may be executed with a parameter, such as WM_HTML_GETOBJECT. The method communicates with the OS which either returns a result e.g., an HTML object or null. Accordingly, the result of the method may be checked 540 and if an HTML object of current window has been returned, then the HTML object may be translated into IHTMLDocument2 element 550, that may be stored in a local storage 570 and the window or process count may be reduced by 1 560.

According to some embodiments of the present disclosure, when the result of the method is checked 540 and it is null than the window or process count may be reduced by 1 560.

According to some embodiments of the present disclosure, by using Win32 API provided by the OS core, the window for the HTML control may be queried. In case it exists in the window, it may be casted into an IHTMLDocument2 object and saved in the local storage, such as database 190 in FIG. 1.2

According to some embodiments of the present disclosure, main entities taken from the Win32 API and used are IHTMLDocument2 element which gets information about the document and examines and modifies the HTML elements and text in the document. SendMessage function which which sends the specified message to a window or windows. The SendMessage function calls the window procedure for the specified window and does not return until the window procedure has processed the message. WM_HTML_GETOBJECT the parameter sent to the window to query it for the HTML control.

FIG. 6 is a high-level workflow 600 of window selection from a list of browser-windows, in accordance with some embodiments of the present disclosure.

According to some embodiments of the present disclosure, a selection of a browser-window from a list of browser-windows may be operated by an IHTMLDocument2 object 660 being declared, which holds a pointer, i.e., the address of the Window memory 610.

According to some embodiments of the present disclosure, the selected IHTMLDocument2 object, which has properties, methods events 620 may be sent by the application with relevant properties, and the title and the actual HTML controls of the browser-window may be selected 630. The HTML property may be received from the object 640 and the real-time HTML code of the browser-window may be displayed 650 to the developer. e.g., as shown in FIG. 9.

Figure 7:
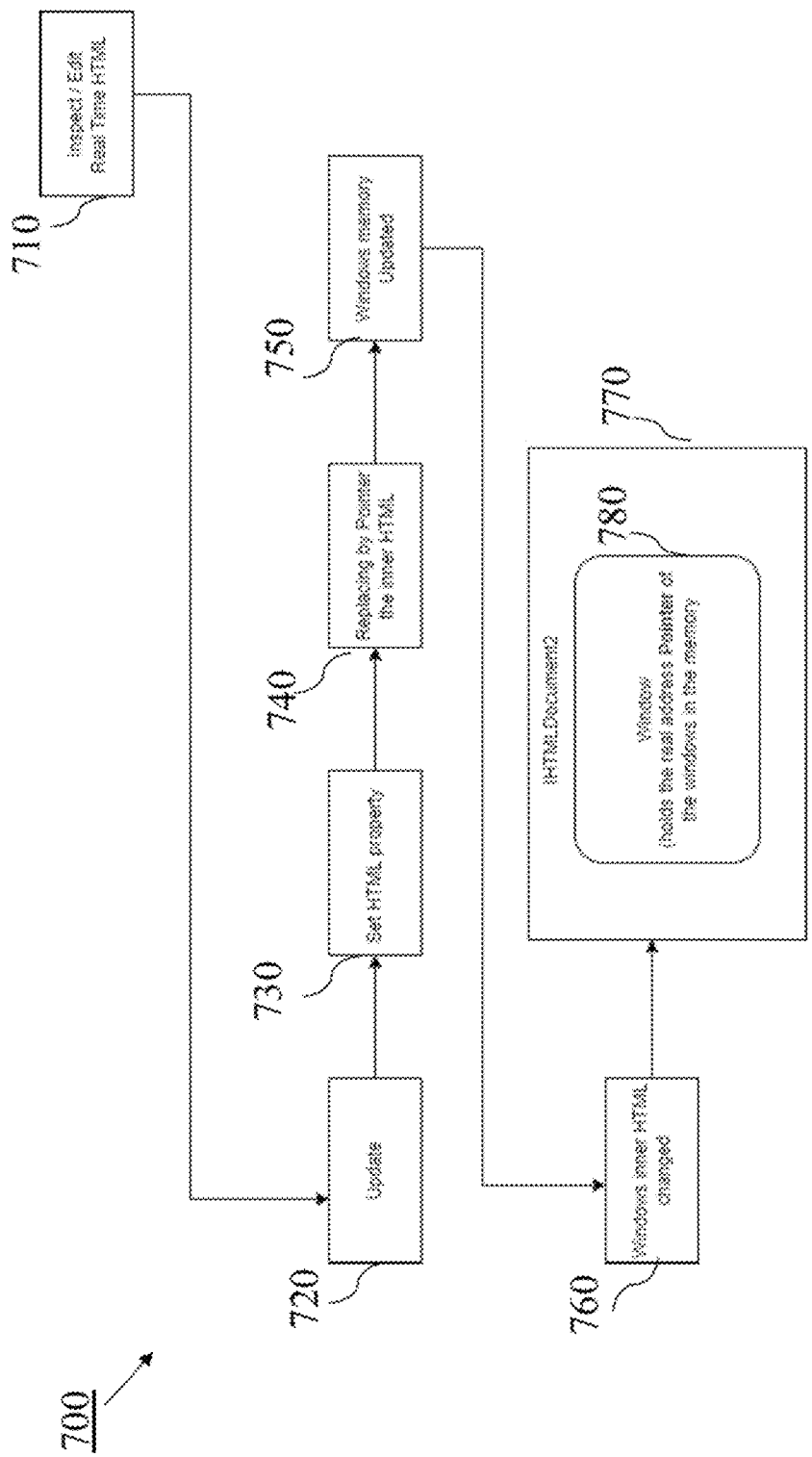
FIG. 7 is a high-level workflow of updating code of a browser-window, in accordance with some embodiments of the present disclosure.

FIG. 7 is a high-level workflow 700 of updating code of a browser-window, in accordance with some embodiments of the present disclosure.

According to some embodiments of the present disclosure, a system, such as system 100 in FIG. 1, tackles a significant challenge faced by automation developers who work with attended automations. This challenge revolves around the limited ability to debug, observe, and modify the code browser-windows, such as "Callout window" and active processes that utilize HTML Control coming from several sources, during run-time on Windows platforms. The callout window is a pop-up window that plays a crucial role in assisting users of the software application during automation tasks. It consists of dynamic data and can be susceptible to development bugs or issues.

Currently, there is no straightforward method to directly inspect the underlying code, i.e., real-time code of the callout window, making it difficult to debug and troubleshoot any problems that may arise during its execution.

According to some embodiments of the present disclosure, a system, such as system 100 in FIG. 1, may enable inspection and edit of real-time HTML code 710. Then, the HTML code may update 720 after the software application marks it as dirty, and an update button which has been enabled is clicked by the developer.

According to some embodiments of the present disclosure, the HTML property may be set 730 and the inner HTML code may be replaced by pointer 740, i.e., the address of the Window memory. Then, the browser-window memory may be updated 750 and the browser-window inner HTML code, which holds a pointer, i.e., the address of the Window memory 780 may be changed 760 via the IHTMLDocument2 interface 770. The HTML window object created by the IHTMLDocument2 interface is the same instance as the displayed browser-window, i.e., the memory address is the same address for both the displayed browser-window and the object window. Therefore, every change that takes place on one of those objects, such as object 180 in FIG. 1, may affect immediately the related browser-window. When setting the HTML content in the IHTMLDocument2 object, the content may be presented in the displayed browser-window.

Figure 8A:
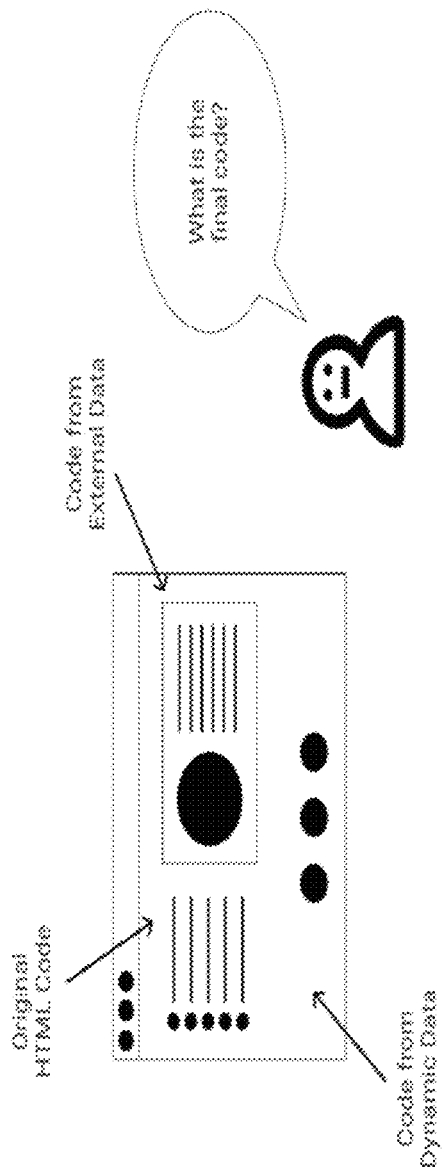
FIGS. 8A-8B shows embedded code in a browser-window, in accordance with some embodiments of the present disclosure.
Figure 8B:
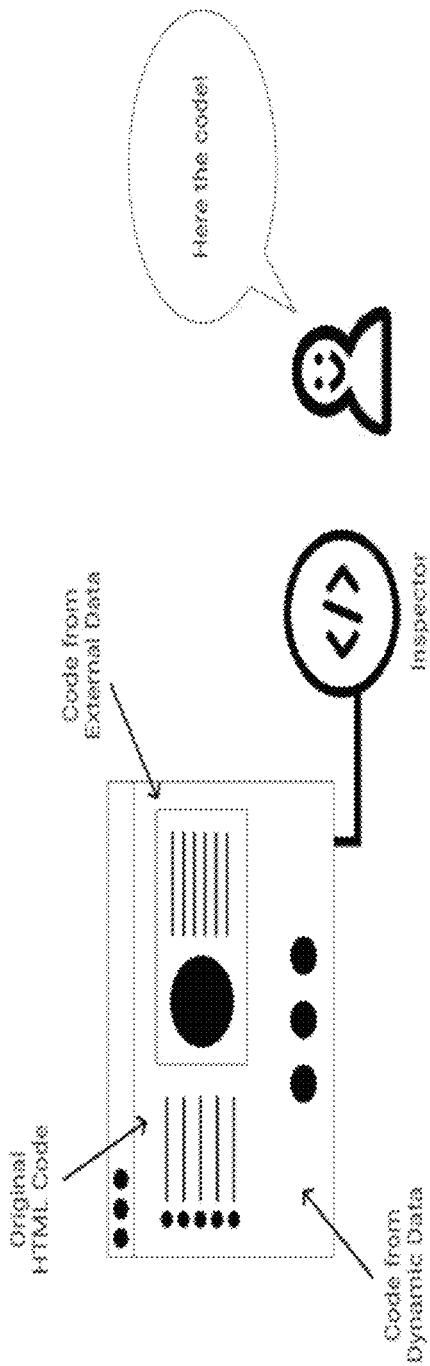

FIGS. 8A-8B shows embedded code in a browser-window, in accordance with some embodiments of the present disclosure.

FIG. 8A shows a situation where during callout window run-time, the dialog often does not appear exactly as designed or behave as expected. This can occur due to data being filled from an external source or errors in the code itself. As a result, the callout window layout can be disrupted, and developers frequently struggle to identify the source of the problem. Currently, there is no effective way to pinpoint the issue.

According to some embodiments of the present disclosure, as shown in FIG. 8B an inspection tool, or a browser-window debugger, such as system 100 in FIG. 1, may provide the capability to view the real-time HTML code behind the scenes and test it during runtime to identify HTML errors, JavaScript errors, or errors related to data sources of a third-party data or APIs.

FIG. 9 is an example of a callout window and a callout debugger, in accordance with some embodiments of the present disclosure.

According to some embodiments of the present disclosure, a browser-window, such as callout window 910 having a design with various components and features may be implemented by a system, such as system 100 in FIG. 1. The depiction may include an avatar, which may represent a user, or a character associated with the callout window. Additionally, there may be dynamic insights that provide real-time information or updates within the callout windows. The web browser controls may be visible, via an editor 920 to enable user interaction and manipulation of the callout window functionality.

According to some embodiments of the present disclosure, there may be input fields in the browser-window 910 that are allowing users to enter data or make selections as necessary. Furthermore, generated data may be displayed, potentially showing dynamically generated content or information relevant to the callout window.

According to some embodiments of the present disclosure, a system, such as system 100 in FIG. 1, may provide an editor which is a callout debugger or inspection tool 920, by presenting the real-time code of the one or more elements used to collect or manipulate data on the browser-window to enable errors inspection therein and real-time one or more updates of the code of the one or more elements used to collect or manipulate data on the browser-window via the interface of the related object. The editor content is the value of the content property of the object interface.

According to some embodiments of the present disclosure, the inspection tool 920 may be a separate standalone window application designed to assist developers or users in debugging and troubleshooting browser windows, such as callout windows. The callout debugger 920 may provide a user-friendly interface and functionality. It may offer a drop-down selection menu, allowing users to choose either an active HTML window or a specific callout process to inspect and analyze. Once a selection is made, the callout debugger may extract the underlying HTML code associated with the chosen element or process. The extracted HTML code may then be displayed prominently in the middle section of the callout debugger window 920, providing users with a comprehensive view of the code structure.

According to some embodiments of the present disclosure, the inspection tool 920 may have interactive capabilities. Developers may have the ability to modify and edit the displayed HTML code directly within the callout debugger interface 920. They can make changes, additions, or corrections as required to address any issues or customization needs in the embedded code of the browser-window. As developers make these modifications, the callout debugger 920 may dynamically reflect the applied changes, providing a preview of how the updated HTML code is translated into the actual callout window. This real-time visual feedback allows developers to iteratively refine and fine-tune the callout window appearance and behavior according to their requirements.

Figure 10:
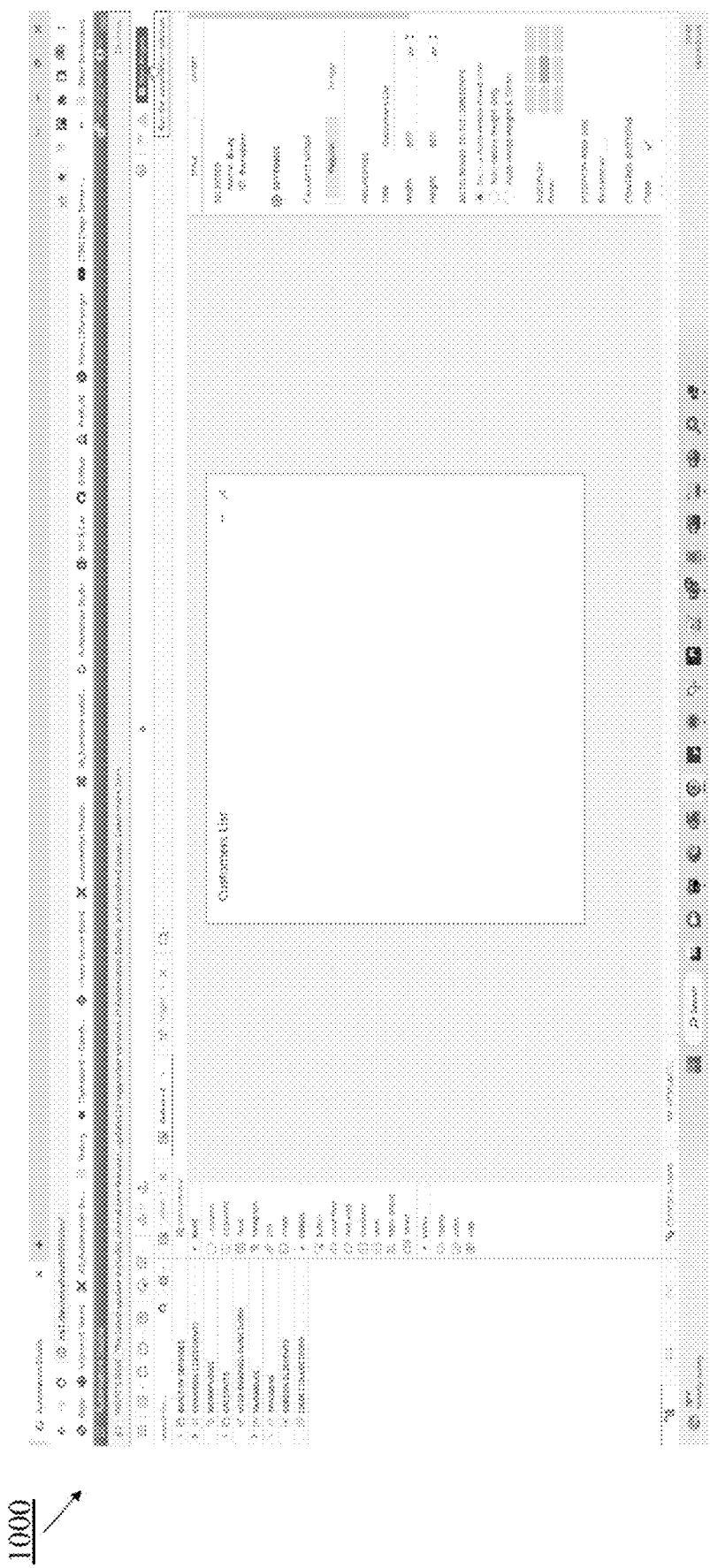
FIG. 10 is an example of a browser-window that displays an empty customer list due to issues in embedded code, in accordance with some embodiments of the present disclosure.

FIG. 10 is an example of a browser-window that displays an empty customer list due to issues in embedded code, in accordance with some embodiments of the present disclosure.

According to some embodiments of the present disclosure, a browser-window may have embedded code from external source which may return an empty list of customers due to nonavailability of the external resource, or a bug at the external resource server, or a security block by the OS that is operating the request of the remote data. A system, such as system 100 in FIG. 1, may provide the real-time code of the embedded code of the browser-window, thus shedding some light on the source of the issue of the code from the eternal source.

Figure 11:
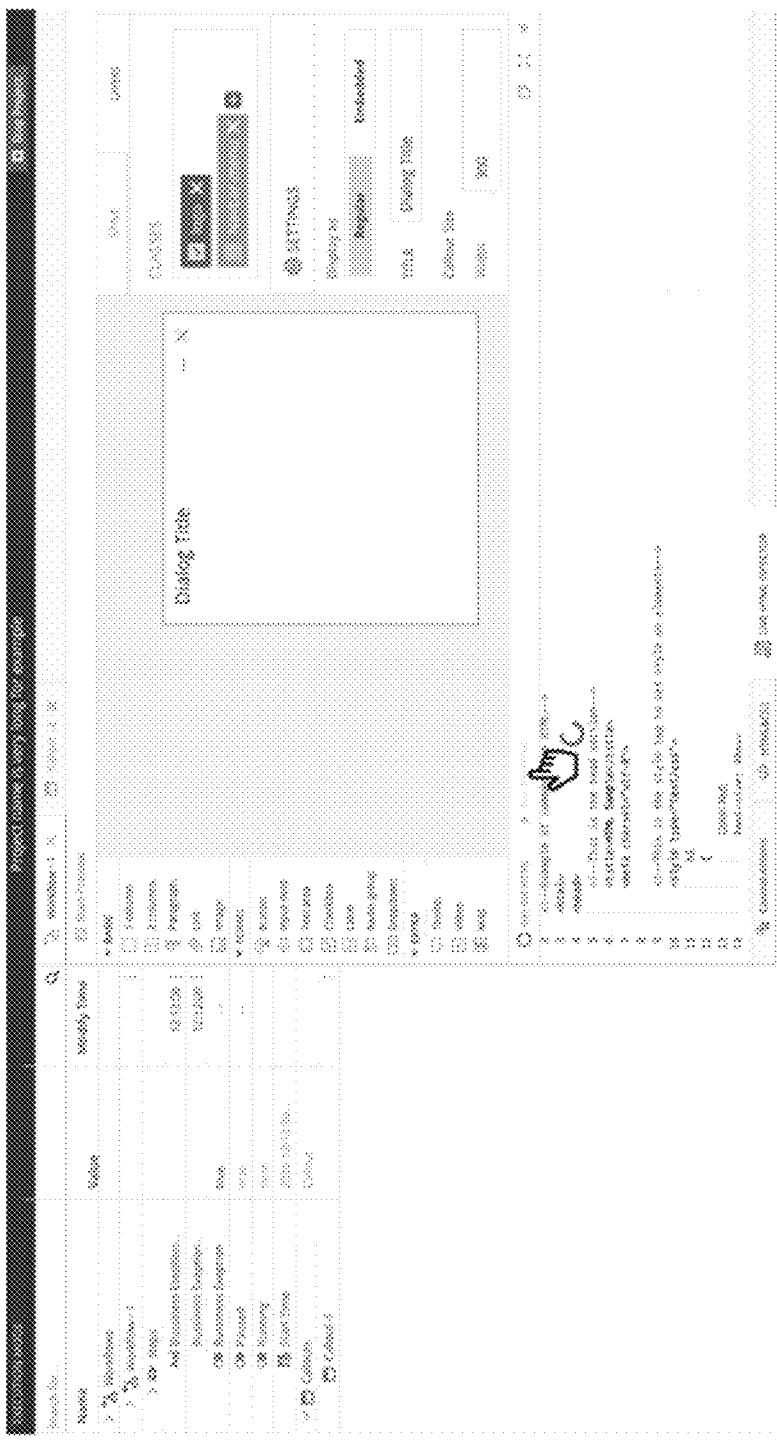
FIG. 11 is an example of an implementation of displaying real-time code of embedded code in a browser-window of a software application, in accordance with some embodiments of the present disclosure.

FIG. 11 is an example 1100 of an implementation of displaying real-time code of embedded code in a browser-window of a software application, in accordance with some embodiments of the present disclosure.

According to some embodiments of the present disclosure, example 1100 shows a way to define a callout window that will be implemented in a browser-window containing HTML control. In the example 1100, the developer can define any HTML control inside the browser-window, such as callout window, including a table that will host external data. There are many other tools' other the one shown in example 1100, that enable HTML editing in a graphic method, i.e., drag and drop element into the HTML page.

Figure 12:
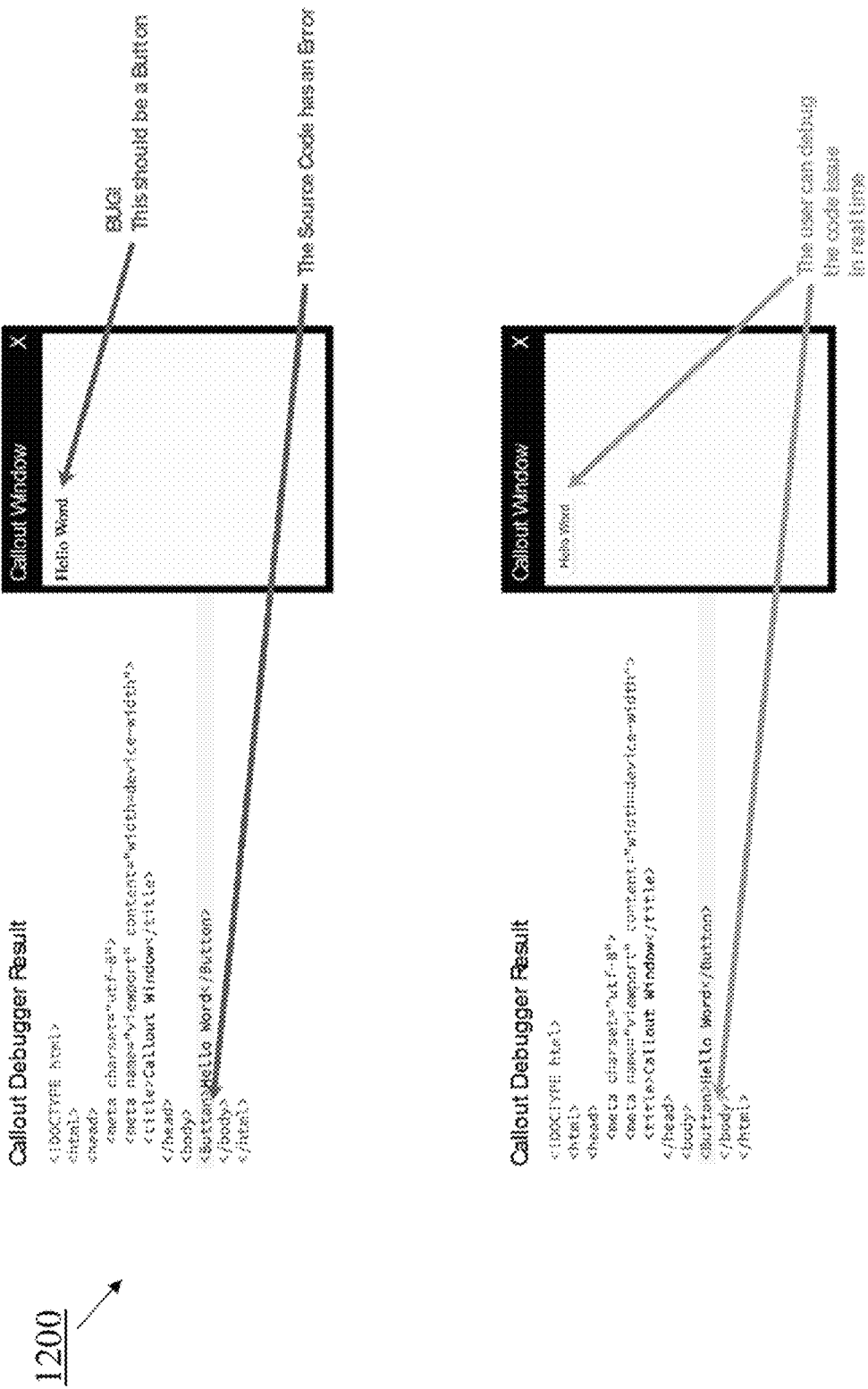
FIG. 12 is an example of issues in embedded code and a fix to the issues in the embedded code by a code update, in accordance with some embodiments of the present disclosure.

FIG. 12 is an example 1200 of issues in embedded code and a fix to the issues in the embedded code by a code update, in accordance with some embodiments of the present disclosure.

According to some embodiments of the present disclosure, a system, such as system 100 in FIG. 1 may provide the real-time code of a browser-window for inspection and correction. Once the real-time code may be displayed a developer may correct the error in the embedded code of the browser-window.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus, certain embodiments may be combinations of features of multiple embodiments. The foregoing description of the embodiments of the disclosure has been presented for the purposes of illustration and description. It is not intended to be exhaustive or to limit the disclosure to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the disclosure.

While certain features of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the disclosure.

What is claimed:

1. A computer-implemented method for displaying real-time code of embedded code in a browser-window of a software application comprising:
   (i) collecting one or more processes related to one or more software applications running on an Operating System (OS) by using an Application Programming Interface (API);
   for each process in the collected one or more processes:
   (ii) searching for one or more browser windows including one or more elements used to collect or manipulate data on a browser-window to yield a list of one or more browser-windows;
   (iii) receiving a selection of a browser-window from the list of one or more browser-windows;
   (iv) casting one or more elements used to collect or manipulate data on the browser-window of the selected browser-window into a related object that is implementing an interface and storing the related object with an associated address of the browser-window in a database; and
   (v) presenting real-time code of the one or more elements used to collect or manipulate data on the browser-window to enable errors inspection therein and real-time one or more updates of a code of the one or more elements used to collect or manipulate data on the browser-window via the interface of the related object.

2. The computer-implemented method of claim 1, wherein the real-time code is at least one of:
(i) original code; (ii) injected code from external source which provides external data; and (iii) injected code which provides dynamic data.

3. The computer-implemented method of claim 1, wherein the one or more elements used to collect or manipulate data in the selected browser-window interpret into User Interface (UI) are at least one code type of: (i) Hyper Text Markup Language (HTML) code; (ii) JavaScript code; and (iii) Cascading Style Sheets (CSS) code.

4. The computer-implemented method of claim 1, wherein a software application of the one or more software application is an attended automation that runs under user supervision and wherein the browser-window is a callout window within a User Interface (UI) for the attended automation.

5. The computer-implemented method of claim 1, wherein the one or more elements used to collect or manipulate data on the browser-window are web browser controls.

6. The computer-implemented method of claim 5, wherein the one or more processes are Windows® processes and the searching for one or more browser-windows including one or more elements used to collect or manipulate data on the browser-window is operated by a mechanism of Windows® OS.

7. The computer-implemented method of claim 6, wherein the mechanism of the Windows® Operating System (OS) is sendWindowMessage* with WM_HTML_GETOBJECT* parameter.

8. The computer-implemented method of claim 7, wherein the implemented interface is an IHTMLDocumnet2 interface.

9. The computer-implemented method of claim 8, wherein the object is an HTMLDocument2 object which examines and modifies HTML elements and text of the HTMLDocument2 object via the IHTMLDocument2 interface.

10. The computer-implemented method of claim 1, wherein the searching of one or more browser-windows is operated when an application is loaded and when a search is initiated by a user.

11. The computer-implemented method of claim 1, wherein when real-time one or more updates are performed by a user to the code of the one or more elements used to collect or manipulate data on the browser-window via the interface, the computer-implemented method is further comprising enabling an update process of the code of the one or more elements used to collect or manipulate data on the browser-window, by using the associated address of the browser-window, within the OS.

12. The computer-implemented method of claim 1, wherein the API enables developers to interact with the OS to develop applications.

13. The computer-implemented method of claim 1, wherein the computer-implemented method further comprising receiving a selection of more than one browser-window from the list of one or more browser-windows, and then casting one or more elements used to collect or manipulate data on each browser-window of the more than one browser-window into a related object that is implementing an interface and storing the corresponding object with an associated address of the related browser-window in a database and presenting real-time code of the one or more elements used to collect or manipulate data on each elected browser-window to enable errors inspection therein and real-time one or more updates of the code of the one or more elements used to collect or manipulate data on each browser-window via the interface of the related object.

* * * * *